April 4, 1950     R. C. COBURN     2,502,825
PIPE CUTTER
Filed May 7, 1947
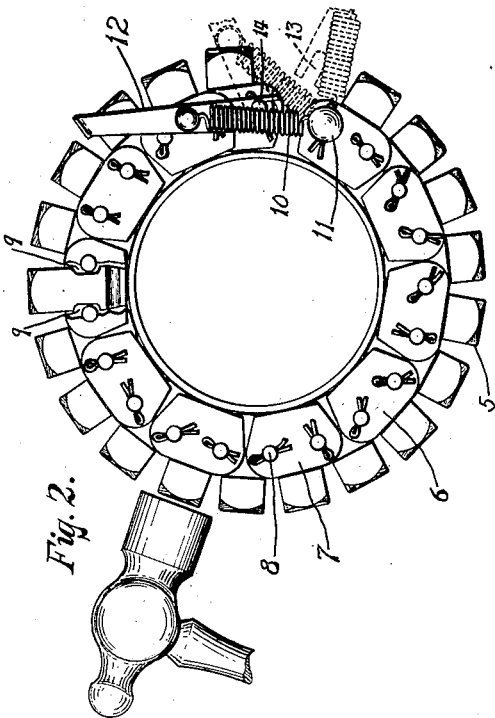
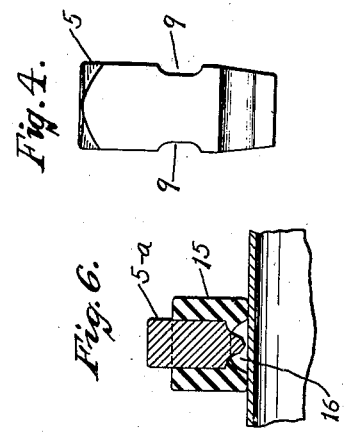
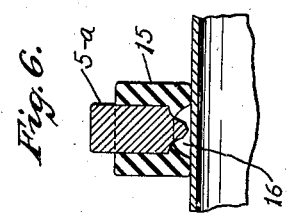
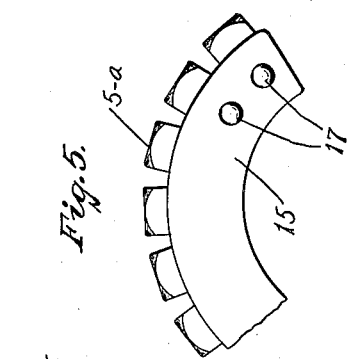
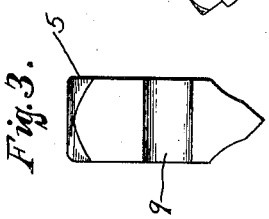
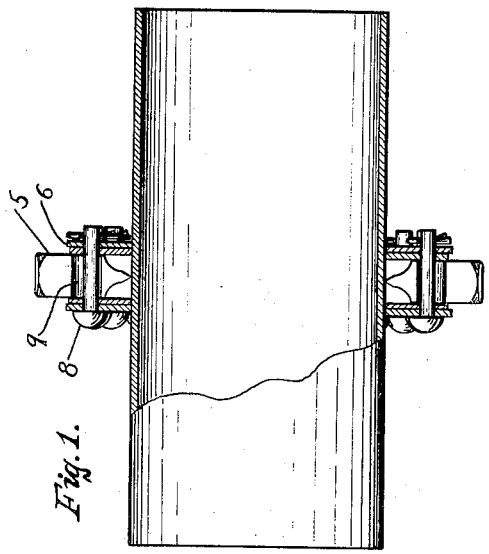
INVENTOR.
ROBERT C. COBURN
BY Louis V. Lucia
ATTORNEY.

Patented Apr. 4, 1950

2,502,825

UNITED STATES PATENT OFFICE 2,502,825

PIPE CUTTER

Robert C. Coburn, East Hartford, Conn.

Application May 7, 1947, Serial No. 746,434

7 Claims. (Cl. 30—95)

This invention relates to pipe cutters and more particularly to devices for cutting cast iron pipe such as commonly used in plumbing.

An object of this invention is to provide a pipe cutter which is easy to use and whereby a clean cut may be made for severing cast iron pipe or the like.

A further object of this invention is to provide such a device which is adjustable for different sizes of pipe.

Further objects and advantages of this invention will be more clearly understood from the following description and from the accompanying drawings, in which:

Fig. 1 is an end view, partially in central vertical section, showing my improved pipe cutter.

Fig. 2 is an elevational side view thereof.

Fig. 3 is an elevational end view of one of the cutting members used in said device.

Fig. 4 is an elevational side view of said cutting member.

Fig. 5 is an elevational side view of a portion of the modified form of pipe cutter embodying my invention.

Fig. 6 is a fragmentary end view of said modified form of cutter as used upon the pipe.

In the embodiment of my invention illustrated in the drawing, my improved pipe cutter comprises a plurality of cold chisels 5 which are moveably contained within a flexible holder that is preferably in the form of a chain 6 comprising a plurality of links 7 secured together by means of pins 8. Each of said chisels is constructed with notches 9—9 in opposite sides thereof which receive the pins 8 and slidably secure the chisel to the chain 6 between the links thereof. This permits longitudinal movement of the chisels and secures them to the chain.

At the end of the chain 6 there is provided a resilient fastener preferably comprising a spring 10 which is pivotally secured to the end pin 11 on the chain and carries a U-shaped lever 12 having a fork 13 at the end thereof that fits over the pivot pin 14 and swivels thereon to draw the ends of the chain together for securing the cutting device around the pipe that is to be cut, as clearly illustrated in Fig. 2 of the drawings.

The operation of cutting a pipe or pipes with my improved pipe cutter is as follows:

The cutter is placed around the pipe and clamped thereon, by means of the clamping lever 12, in the position shown in Fig. 2. This positions the chisels 5 upon the outer surface of the pipe and on a line extending around said pipe. Each of said chisels is then struck with a hammer, as shown in Fig. 2, until the pipe is severed. In some cases, however, after all of the chisels around the pipe have been struck, the said cutter may then be removed from the pipe by releasing the clamp lever 12, and the pipe may be separated by striking it further to produce from the cuts a crack extending around the pipe.

It will be noted that the links 6 are so formed that they will rest upon the surface of the pipe at each side of the chisels and thereby support the said chisels perpendicularly to the pipe and free to move towards the pipe when struck by the hammer.

In the modified form shown in Figs. 5 and 6, my improved pipe cutter may be constructed by providing a resilient support in the form of a ring or elongated bar 15 which may be molded of rubber with the chisels 5—a inserted therein and bonded thereto. As shown in Fig. 6, it will be noted that the said bar is constructed so that it will rest upon the surface of the pipe and support the chisels 5—a with their cutting edges in a position just free of the pipe surface and preferably within a groove 16 which runs along the inner side of the bar 15.

In the operation of this modified form of cutter, when the chisels 5—a are struck with a hammer, the resilient material of the bar 15 yields sufficiently to permit the cutting edge of the chisels to cut into the surface of the pipe and the inner surface of said bar will position the bar on the pipe so that it will support the chisels perpendicularly thereto. In order to secure this modified form of the cutter to the pipe, pins 17 may be provided adjacent the end thereof to receive a suitable fastening device such as shown in Fig. 2.

I claim:

1. A pipe cutter of the character described comprising a flexible support having movably mounted therein a plurality of cutting chisels projecting from one side of said support, each of said chisels having a cutting edge on a line with the cutting edges of adjacent chisels, and a head projecting from the opposite side of said support, and means for securing said support around a pipe with the said cutting chisels extending perpendicularly to the pipe.

2. A pipe cutter of the character described comprising a chain including a plurality of links hingedly connected and adapted to be fastened around a pipe which is to be cut, a plurality of cutting chisels movably connected to said chain and supported thereby perpendicularly to the pipe; each of said chisels having a cutting edge extending from one side of said chain in the direction of said pipe and in line with the cutting edges of the adjoining chisels, and a head extending from the opposite side of the chain whereby, upon the said head being struck, each of said chisels will notch the pipe on a line extending around the pipe and thereby provide a line of cut for severing the pipe.

3. A pipe cutter of the character described comprising a chain including a plurality of links hingedly mounted, pins extending across said links to a similar chain spaced from the first chain, a plurality of cutting chisels slidably mounted between said pins and secured between said chains by means of notches in opposite sides of the chisels receiving said pins, and clamping means for fastening said cutter around a pipe to be cut with said chisels supported in perpendicular position with respect to the pipe and their cutting edges on a line extending around the pipe.

4. A pipe cutter of the character described comprising a supporting bar constructed of resilient material, a plurality of cutting members contained in said bar and having a cutting edge projecting therefrom, the cutting edges of said members being in line, and means for securing said resilient bar to a pipe to be cut with the said members extending perpendicularly to the pipe; whereby, upon being struck, each of said members is permitted by the resilient material to move into contact with the surface of said pipe and form a cut therein.

5. A pipe cutter of the character described comprising an elongated member of resilient material, such as rubber, adapted to be wrapped around the outer surface of a pipe and clamped thereto, the said member having a groove extending along the inner surface thereof, and a plurality of chisels embedded in said bar and projecting exteriorly thereof at one end and having a cutting edge projecting inwardly within said groove, whereby, when the said bar is secured to the pipe, the said chisels will be supported perpendicularly to the pipe and permitted by said material to move so that their cutting edges will cut said pipe upon being struck at the opposite ends thereof.

6. A pipe cutter of the character described comprising a flexible elongated supporting member, a plurality of independent transversely movable cutting chisels carried by said supporting member and having a head at one end and a cutting edge at the other end extending longitudinally of said supporting member, and means on said supporting member for fastening it in position around a pipe to dispose the said chisels radially with respect thereto and with their cutting edges on a line around said pipe.

7. A pipe cutter comprising a flexible support adapted to be secured around a pipe and having a plurality of independently moveable impression forming members mounted therein, each of said members having a head portion projecting above said support and an end portion adapted to form an impression on said pipe when the head of the member is struck; said end portion being in line with the end portions of adjacent members.

ROBERT C. COBURN.

REFERENCES CITED

The following references are of record in the file of this patent:

UNITED STATES PATENTS

| Number | Name | Date |
|---|---|---|
| 1,510,256 | Conning | Sept. 30, 1924 |

FOREIGN PATENTS

| Number | Country | Date |
|---|---|---|
| 608,040 | Germany | Sept. 28, 1932 |